United States Patent [19]

Takai et al.

[11] Patent Number: 4,479,155
[45] Date of Patent: Oct. 23, 1984

[54] AUTO-LOADING MECHANISM IN A MAGNETIC RECORDING/REPRODUCING APPARATUS

[76] Inventors: Kazuki Takai; Hitoshi Okada; Katsumi Yamaguchi, all of 50 Kamitoda, Toda-Shi, Saitama-ken, Japan

[21] Appl. No.: 313,363

[22] Filed: Oct. 20, 1981

[51] Int. Cl.³ .................. G11B 15/68; G11B 15/18
[52] U.S. Cl. .................. 360/96.5; 360/96.6; 242/197; 242/208
[58] Field of Search .......... 360/96.5, 96.6, 93, 360/96.1; 242/197–200, 206, 208

[56] References Cited

U.S. PATENT DOCUMENTS

| | | | |
|---|---|---|---|
| 3,669,455 | 6/1972 | Cicatelli | 360/93 |
| 4,014,041 | 3/1977 | Cicatelli | 360/96.5 |
| 4,308,562 | 12/1981 | Negishi | 360/96.5 |
| 4,337,487 | 6/1982 | Takai | 360/93 |
| 4,377,829 | 3/1983 | Kamimura et al. | 360/93 |

Primary Examiner—Stuart N. Hecker

[57] ABSTRACT

An auto-loading mechanism in a tape player which comprises an operational member driven by a motor to slide and formed with a first, second and third operational portion which engage with a lock plate for locking a slide member for sliding while being contact with an inserted tape pack, an insertion frame for setting the tape pack in the playing position as well as a shift member for shifting a head plate or a member operatively connected to those members, and, the operational member further comprises a spring for storing ejecting force during the loading time by driving the motor.

4 Claims, 8 Drawing Figures

AUTO-LOADING MECHANISM IN A MAGNETIC RECORDING/REPRODUCING APPARATUS

BACKGROUND OF THE INVENTION

1. Field of the Invention

The present invention relates to an auto-loading mechanism in a tape player and more particularly to a mechanism capable of performing an ejecting operation not only with only a small operational force but also with a high accuracy in any conditions, by storing ejecting energy by means of motor outputs upon insertion of a tape pack.

2. Description of the Prior Art

There have conventionally been proposed various manners of automatic ejection for automatically taking out a tape pack inserted in a tape player.

However, any of such conventional auto-eject mechanisms has been arranged to previously insert a tape pack by a users's manual pushing force against spring force to be stored for ejecting energy, thus requiring a relatively large load for tape insertion, and therefore, they have had such a drawback in view of operability that a very large operational force is required particularly soon before the completion of tape pack insertion.

Further, in order to solve such a problem, there has been proposed a mechanism which is arranged to perform ejection by utilizing a motor power. Such a manner does not certainly requires to store ejecting energy upon tape pack insertion. However, such a manner has had such a drawback that a tape pack remains in a tape player when the power source of the motor is cut off during ejecting operation, thus making it impossible to take out the tape pack.

SUMMARY OF THE INVENTION

It is therefore an object of the present invention to solve such conventional problems.

In accordance with the present invention there is provided an auto-loading mechanism in a magnetic recording/reproducing apparatus which comprises:

a motor;

a slide member for sliding due to insertion of a tape pack in said apparatus;

an operational member which is slidable;

an engagement means for transmitting driving energy of said motor to said operational member in response to arrival of said slide member at a predetermined position;

an insertion frame interlocking with said operational member for setting a tape pack in the recording/reproducing position;

a shift means interlocking with said operational member for shifting a head plate to said recording/reproducing position; and a spring fixed on said operational member for applying thereto an ejecting bias force toward a direction opposed to the driving force of said motor.

BRIEF DESCRIPTION OF THE DRAWINGS

The drawings illustrate preferred embodiments according to the present invention in which.

DETAILED DESCRIPTION OF THE PREFERRED EMBODIMENTS

Figure 1:
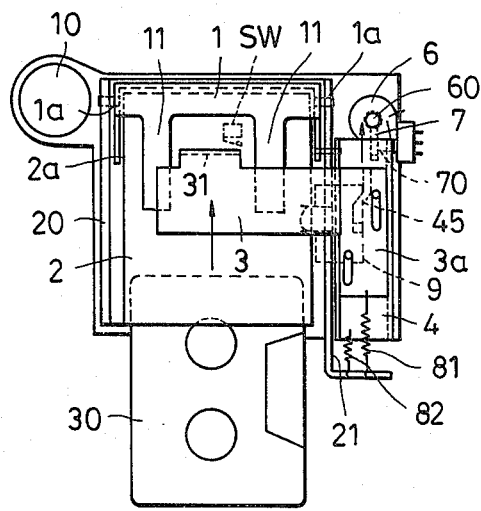
FIG. 1 shows a plan view of a tape player having a loading mechanism according to the present invention.

The present invention will now be described in detail referring to the preferred embodiments illustrated in the drawings.

Figure 4:
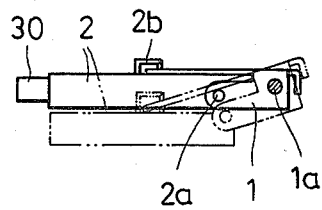
FIG. 4 shows a side view illustrating the insertion frame and the tape pack guide.

On a deep portion of a board 20 there is pivotally mounted an insertion frame 1 supported by pivots 1a, 1a for pushing a tape pack 30 in the reproducing position. A pack guide 2 is pivotally supported by a pivot 2a at the rear end portion thereof on a pivotal end of the insertion frame 1 as shown in FIG. 4, too, and pendently supported by a pendant 2b at the balancing center thereof. Between extending portions 11, 11 of the insertion frame 1 provided with the pack guide 2 as above, there is disposed an engaging portion 31 formed on one of ends of a slide member 3 in a manner being bent and pending to be thereby in contact with the tape pack 30 when it is inserted into the pack guide 2 and slide together with the tape pack 30 as shown in FIG. 1.

Figure 2:
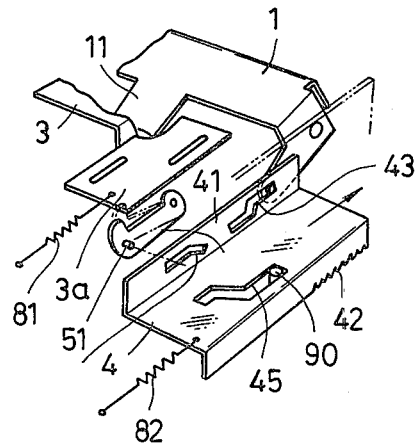
FIG. 2 shows perspective views of a part of the operational plate, the insertion frame and the slide member.

The slide member 3 is formed at one side thereof with a guide 3a extending over an operational board 21 formed on the front end of the board 20. An operational plate 4 is mounted in a lower portion of the guide 3a as shown in FIG. 2. That is, the operational plate 4 is formed with an abutting plate 41 by upwardly bending one of the side portions thereof for being in contact with a side of the board 20 and a rack portion 42 by downwardly bending the other side of the operational plate 4. Further, the abutting plate 41 is formed with a first operational slit 43 at a rear end portion thereof for raising and laying the insertion frame 1 and a second operational slit 44 at a front end portion of the abutting plate 41 for operating a lock plate 5 with respect to the slide member 3. In the horizontally plane portion of the operational plate 4 extending between the abutting plate 41 and the rack portion 42, there is formed a third operational slit 45 for guiding a slidable movement of a head plate 9.

Figure 5:
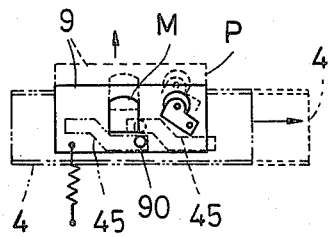
FIG. 5 shows an explanatory plan view illustrating operational relation of the operational plate against the head plate.

The lock plate 5 is pivotally mounted on the board 20 at the base end thereof and the pivotal end of the lock plate 5 is formed with a projection 51 for engaging with the second operational slit 44. The head plate 9 on which a head M, etc are mounted as shown in FIG. 5 is provided with a guide pin 90 vertically extending and fixed for engaging with the third operational slit 45 as shown in FIG. 2.

Figure 3:
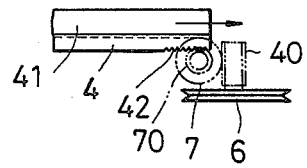
FIG. 3 shows a side view illustrating a driving relation for the operational plate.

On the board 20 there is mounted a motor (not shown) in an adequate position thereof and a belt hung on the motor is also hung on a pulley 6 which is positioned on a lower surface of the board 29 as shown in FIG. 3. A worm 60 integrally formed with the pulley 6 engages with a worm wheel 7. A meshing portion 70 having a common axis with the worm wheel 7 meshes with the rack portion 42. Further, between the slide member 3 as well as the operational plate 4 and the operational board 21, there are provided tension springs 81 and 82, respectively.

Figures 6, 7:
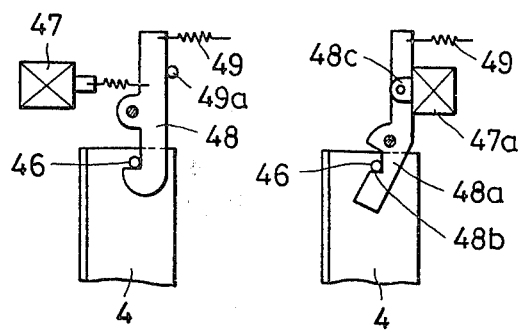
FIGS. 6 and 7 each is an explanatory view illustrating the lock mechanism of the operational plate.

The operational plate 4 is to be adequately locked in its advanced position as shown in FIGS. 6 and 7. That is, in FIG. 6, the operational plate 4 is formed with a projection 46 at a rear end portion thereof for engaging with an engaging plate 48 which is displaced by an attracting plunger 47. The engaging plate 48 is provided with a spring 49 and a stopper 49a for allowing the projection 46 to inwardly advance when the projection 46 of the operational plate 4 under deenergized condition of the electromagnetic plunger 47 to be thereby locked by a hook 48b of the engaging plate 48. On the other hand, in FIG. 7, a magnetized chip 48c is attracted by the plunger 47a to adequately fix the engaging plate 48a so as to receive the projection 46. A spring 49 is mounted on the engaging plate 48a in the same manner as in FIG. 6.

When the operational plate 4 advances to a sufficient extent to lower the insertion frame 1 to the utmost depth in the first operational slit 43, the operational plate 4 is locked in the playing condition. When such lock of the operational plate 4 is released ejection of the tape pack is carried out.

In other words, the locked condition of the operational plate 4 by the engaging plate 48 is released by energizing the attracting plunger 47 in case of FIG. 6 while the engagement of the engaging plate 48 is released by deenergizing the plunger 47a in case of FIG. 7. Energization of the plunger 47 and deenergization of the plunger 47a can adequately be carried out by signals from a known tape-end detector, for example.

Figure 8:
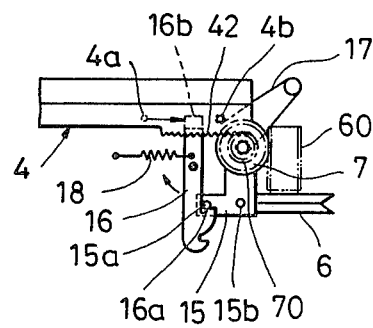
FIG. 8 shows a side view of an engagement/disengagement switching operational mechanism between the worm and the worm wheel.

Incidentally, engagement of the rack portion 42, the meshing portion 70 and the worm 70 is effective particularly when a tape driving motor is used also as a motor 10 for driving the worm 60 because it is possible to disengage the worm 60 from the worm wheel 7 during playing time after loading, thus to realize preferable tape play. To this end, an arrangement as shown in FIG. 8 may be adopted. That is, the worm wheel 7 and the meshing portion 70 are supported by an axis on a support frame 15 and the support frame 15 is mounted on the board 20 by a pivot 15b. The support frame 15 is provided with a projection 15a at a top end portion thereof. A lock member 16 is mounted on the board 20 pivotally at the enter thereof and a hook 16a formed at the pivotal end thereof faces to the above projection 15a. The base end portion 16b of the lock member 16 faces to the projection 4a of the operational plate 4. Further, between the operational plate 4 and the axis on the gear support frame 15, there is provided a contrarotating spring 17 while the lock member 16 is provided with a spring 18.

Then, the operational plate 4 slides in accordance with rotation of the worm 60 to perform loading. Upon completion of the loading, the projection 4a acts on the lock member 16 to unlock it from the gear support frame 15 (release press-fit of the worm wheel 7 with respect to the worm 60). Accordingly, a fixing point 4b on the operational plate 4 for fixing an end of the contrarotating spring 17 displaces toward the other fixing point for the spring 17 on the gear support frame 15 to the extent for causing the spring 17 to have returning force exceeding the force to press the worm wheel 7 to the worm 60, thus applying a force to the gear support frame 15 and the worm wheel 7 for disengaging from the worm 60. Thus, engagement and disengagement in the above portion during playing time can be performed.

Incidentally, although in the above-described embodiment there are provided the first, second and third operational slits 43, 44 and 45 in the operational plate 4 each for serving as a cam bore, those operational slits may be replaced with a linking structure or grooves for receiving engaging projections therein. Further, as to engagement of the rack and the gear, a structure for engaging a semi-circular gear formed at the base end of a pivotal linkage member with the rack may be adopted. Naturally, the operational plate 4 having a rack portion can be operated by a spur gear, a cam, etc. instead of the worm.

The operations of the above-described mechanism according to the present invention will now be described hereunder.

When the tape pack 30 is inserted in the pack guide 2, the slide member 3 is rearwardly pushed against tensing force of the spring 81. When the slide member 3 reaches a predetermined position, an operational portion (a projection 31, for example) formed on the slide member 3 turns on the power source SW, thus driving the motor 10 as well as the worm 60 through the pulley 6. Since the worm 60 is in engagement with the worm wheel 7, the operational plate 4 having the rack portion 42 comes to advance and due to the advancement of the operational plate 4 the pivotal end of the lock plate 5 is upwardly raised by the function of the second operational slit 44 to thereby lock the slide member 3. Thus, even after detaching a hand which has been pushing the tape pack 30, the slide member 3 is held at a predetermined position.

When the operational plate 4 is further pushed to advance, the front end of the insertion frame 1 downwardly pivots along the first operational slit 43 to thereby drop the tape pack 30 in a predetermined position and set it in the reproducing position. Simultaneously with the drop of the tape pack 30, the head plate 9 pushed ahead along the third operational slit 45 to press-fit the head M and a pinch roller P to the tape, thus starting reproduction. In this case, the guide pin 90 is located in the horizontal portion of the third operational slit 45 as shown in FIG. 5 to thereby maintain the reproducing condition.

When the operational plate 4 further advances, it actuates the lock member 17 as shown in FIG. 6 so as to disengage the worm wheel 7 from the worm 60, thus maintaining the reproducing condition.

As to ejection, it is already described that the locked condition of the operational plate 4 is released by deenergizing the electromagnetic plunger 47 or 47a upon receiving the aforementioned tape end signals or the like. At that time an operational force is stored in the spring 82 and the operational plate 4 is pulled out by the spring force. Due to the restoration of the operational plate 4, operations in the order contrary to that performed upon the above-explained insertion. That is, first the head plate 9 retires, next the front end of the insertion frame 1 is raised and the lock plate 5 thereafter pivots downwardly. Due to the downward pivotal movement of the lock plate 5, the slide member 3 is pulled out with the function of the spring 81 to accordingly pull out the raised tape pack 30. When the operational plate 4 is pulled out to an extent exceeding a predetermined position, the supporting point of the contrarotation spring 17 comes to shift to cause engagement between the worm wheel 7 and the worm 60, thus letting the mechanism be ready for the next tape pack insertion.

As described above, according to the present invention, it is possible to perform loading operation by driving a motor and to store ejecting force in a spring during the auto-loading time. Therefore, various operational forces required in handling a tape player of this type can be largely reduced. Further, since the raising/laying operation of the insertion frame 1, the engagement-/disengagement operation with form the slide member 3 of the lock plate 5 and the forward/backward displacement of the head plate 9 can be performed altogether by providing the first, second and third operational slits formed on the single operational plate 4, the present invention has large practical efficiencies in not only simplifying the structure of the mechanism but also obtaining operational interrelations between those members by keeping a good timing.

We claim:

1. A cassette auto-loading mechanism in a magnetic recording and reproducing apparatus comprising:
   a motor for setting an inserted cassette to a recording and reproducing position;
   a slide member for sliding to at least a given position responsively to insertion of a tape cassette in said apparatus;
   a slidingly mounted operational member;
   an engagement means for transmitting driving energy from said motor to slidingly drive said operational member when said slide member arrives at said given position;
   an insertion frame rotatably mounted and interlocking with said slide member and said operational member;
   a head plate interlocking with said operational member, said head plate including a magnetic head mounted thereon;
   a spring fixed to said operational member for applying thereto an ejecting bias force toward a direction opposite to the driving force of said motor, said engagement means comprising a worm driven by said motor, a worm wheel engageable with said worm and a rack formed on said operational member which engages with a gear provided on said worm wheel, and a first lock member for locking said slide member in said given position; said operational member being formed with a first, a second, and a third operational portion, said first operational portion being disposed in engagement with said insertion frame to rotate said insertion frame so as to set said inserted cassette in said recording and reproducing position, said second operational portion being disposed in engagement with said first lock member to effect locking of said slide member, and said third operational portion being disposed in engagement with said head plate to shift said head plate to said recording and reproducing position.

2. A mechanism as claimed in claim 1 further comprising a second lock member for effecting a locking engagement between said worm and said worm wheel, said locked condition of said second lock member being released by said operational member upon completion of loading of said inserted cassette.

3. A mechanism as claimed in claim 1 further comprising a third lock member for locking said operational member in a loading position and a spring for applying a restoring force to said third lock member.

4. A mechanism as claimed in claim 3, wherein a locked condition of said third lock member is released by an electromagnet coupled to actuate said third lock member to a released position responsively to an end-of-tape condition.

* * * * *